UNITED STATES PATENT OFFICE.

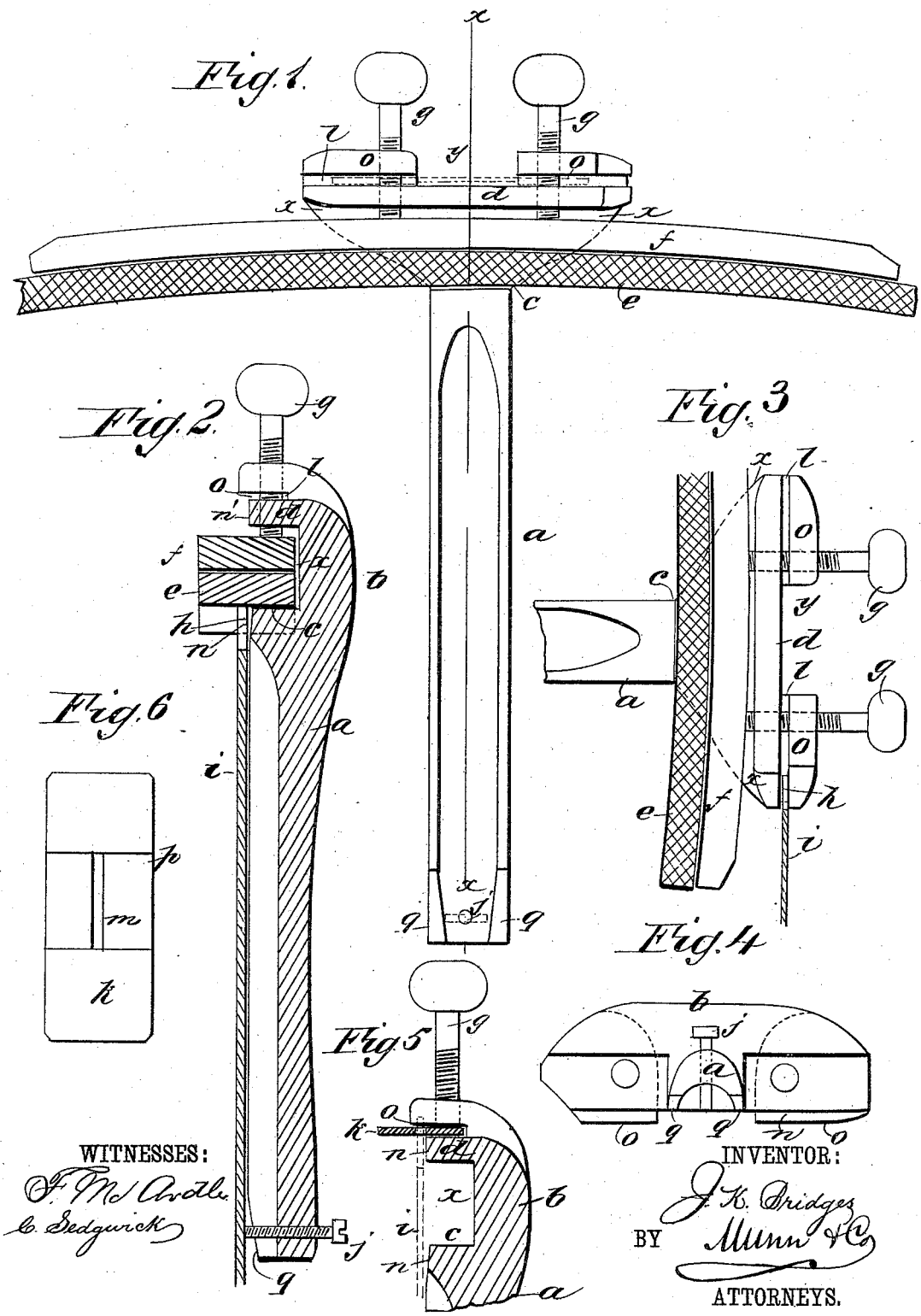

JAMES K. BRIDGES, OF WOODSTOCK, ILLINOIS.

SAW JOINTER AND SET.

SPECIFICATION forming part of Letters Patent No. 306,216, dated October 7, 1884.

Application filed November 23, 1883. (No model.)

*To all whom it may concern:*

Be it known that I, JAMES K. BRIDGES, of Woodstock, in the county of McHenry and State of Illinois, have invented a new and Improved Saw Jointer and Set, of which the following is a full, clear, and exact description.

My invention consists of a simple device contrived to joint the teeth of crowning saws or straight ones; also, to joint the raking teeth, and also to set the teeth of thick or thin saws, and to gage the set of the teeth to ascertain any irregularities of the set for enabling them to be corrected, all as hereinafter fully described.

Reference is to be had to the accompanying drawings, forming part of this specification, in which similar letters of reference indicate corresponding parts in all the figures.

Figure 1 is a side elevation of my improved jointer and set as arranged for jointing the teeth of crowning saws. Fig. 2 is a section of Fig. 1 on the line $x\,x$. Fig. 3 is a side elevation of the tool as adjusted for setting the saw-teeth. Fig. 4 is an elevation of the tool as seen looking at the end of the handle. Fig. 5 is a section of the head of the tool on the line $x\,x$ of Fig. 1, showing the adjustment for jointing the raker-teeth; and Fig. 6 is a plan view of a gage-plate to be used in jointing the rakers.

The stock of the tool consists of the handle $a$ and a tie-head, $b$, at the junction of the handle with the head. Said handle has a shoulder, $c$, opposite to or above which shoulder there is a flange, $d$, forming a groove or notch, $x$, in which the file $e$ is to be clamped for jointing the saw-teeth of crowning saws by the curved bar $f$ and the clamp-screws $g$. The curvature of the bar is to be a little greater than that of most crowning saws, and the concave side is to be placed against the side of the file, to press it against the shoulder $c$ and spring it to the curvature of the saw to be jointed by the clamp-screws. The concave side of the file, projecting part of its breadth out of the recess between shoulder $c$ and flange $d$, is then to be placed on the points of the teeth $h$, with the handle against the saw-plate $i$, so that the face of the file is square to the plane of the saw, the adjusting-screw $j$ in the end of the handle being to correct the position, if not square, by the handle, or when the saw is thinnest at the back. The file is then shoved along the saw forward and backward until the points of the long teeth are jointed down even with the short ones, the curve of the file following the curve of the line of the teeth.

For a saw having a straight edge a straight plate, $f$, will be used.

To joint the points of the raker-teeth, which must be shorter than the cutting-teeth of a crosscut-saw, I place a slotted plate, $k$, in a groove, $l$, formed in the flange of the head for the purpose, and also for nicks in which to place the saw-teeth for setting them, said groove being coincident with a notch, $y$, in the top of the head, and secure said plate by the clamp-screws $g$, with its slot $m$ parallel to the faces $n$ of the handle and $n'$ of the flange $d$. Then, placing the tool against the side of the saw, as represented in Fig. 5, with a raker-tooth projecting through the slot $m$ of the plate, while the cutting-teeth each side of the raker will touch the ledges at $o$, which project a little more than the rest of the face of the flange $d$, I file off the point of the raker-tooth projecting above the surface of the plate $k$ even with the plate. The plate is recessed at $p$ a suitable depth in the surface of one side, to gage the length of the raker-teeth for making the raker-teeth shorter for soft wood than for hard wood.

The groove $l$ forms suitable nicks at the ends of the T-head, to serve for setting the teeth of the saw, as represented in Fig. 3, and the bar $f$ and file $e$, being secured in the clamp suitably for the purpose, form a gage by which to touch the side of the saw and limit the extent of the setting, the said bar and file being shifted along to project more or less at the end, as the teeth are to be set more or less.

In practice the nick of one end of the head will be made wider than the other for thicker saws.

To test the setting, the handle of the tool may be placed against the side of the saw, with the point of the screw $j$ to the points of the teeth, which will readily show if any teeth are either too long or too short. The handle is beveled at $q$ for this purpose, and the face of the handle is also to be beveled at $n$, below shoulder c, to allow the space for the set of the teeth when the saw is placed thereat for jointing.

It is to be understood that the file e is not necessary to the adaptation of the tool for setting the teeth, and, further than that, it is a convenient liner to set the plate f in the required proximity to the saw. A plate of equal thickness to the plate f and the file will serve the same purpose, and a special plate or bar for a setting-gage may be provided.

Having thus described my invention, I claim as new and desire to secure by Letters Patent—

1. The combination of the handle a, provided with a head, b, comprehending shoulder c and flange d, and an adjusting-screw, j, with the clamp-screws g and plate f, substantially as set forth.

2. The combination of the handle a, provided with a head, b, consisting of the shoulder c, flange d, and ledges o, the said ledges being separated from the flange d and from each other by spaces l y, and an adjusting-screw, j, at the lower end of the handle, with the clamp-screws g, whereby the clamping-plate and file and the tooth-holding plate may be interchangeably used, substantially as set forth.

3. The improved tool herein described, consisting of the handle a, formed with a head, b, comprehending the inclined shoulder c n, flange d and ledges o above said flange, incline q at the end of the handle, opposite said head, adjusting-screw j, plate f, file e, and clamp-screws g, substantially as set forth.

JAMES K. BRIDGES.

Witnesses:
MILTON E. HALL,
EUGENE HALL.